United States Patent
Hu et al.

(10) Patent No.: US 9,303,823 B2
(45) Date of Patent: Apr. 5, 2016

(54) SEPIC DRIVER CIRCUIT WITH LOW INPUT CURRENT RIPPLE

(71) Applicant: Cree, Inc., Durham, NC (US)

(72) Inventors: Qingcong Hu, Morrisville, NC (US); Ashish Ekbote, Carpinteria, CA (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/292,001

(22) Filed: May 30, 2014

(65) Prior Publication Data

US 2015/0312974 A1 Oct. 29, 2015

Related U.S. Application Data

(60) Provisional application No. 61/984,467, filed on Apr. 25, 2014.

(51) Int. Cl.
| | |
|---|---|
| *H05B 37/02* | (2006.01) |
| *F21K 99/00* | (2010.01) |
| *F21V 29/503* | (2015.01) |
| *F21V 23/00* | (2015.01) |
| *F21V 23/06* | (2006.01) |
| *F21V 7/00* | (2006.01) |
| *F21V 3/00* | (2015.01) |
| *H01R 43/00* | (2006.01) |
| *H05B 33/08* | (2006.01) |
| *F21Y 101/02* | (2006.01) |
| *F21W 131/10* | (2006.01) |

(52) U.S. Cl.
CPC ............... *F21K 9/1355* (2013.01); *F21V 3/00* (2013.01); *F21V 7/0066* (2013.01); *F21V 23/007* (2013.01); *F21V 23/06* (2013.01); *F21V 29/503* (2015.01); *H01R 43/00* (2013.01); *H05B 33/08* (2013.01); *H05B 33/089* (2013.01); *H05B 33/0815* (2013.01); *H05B 33/0827* (2013.01); *H05B 33/0848* (2013.01); *F21W 2131/10* (2013.01); *F21Y 2101/02* (2013.01)

(58) Field of Classification Search
USPC ............... 315/185 R, 209 R, 219, 227 R, 291
See application file for complete search history.

(56) References Cited

U.S. PATENT DOCUMENTS

| | | | | |
|---|---|---|---|---|
| 4,675,797 | A * | 6/1987 | Vinciarelli | 363/21.04 |
| 2014/0062333 | A1* | 3/2014 | Sonobe | 315/291 |

OTHER PUBLICATIONS

U.S. Appl. No. 14/071,733 entitled, "Minimum off time Control Systems and Methods for Switching Power Converters in Discontinuous Conduction Mode."

* cited by examiner

*Primary Examiner* — Thuy Vinh Tran
(74) *Attorney, Agent, or Firm* — Steven B. Phillips; Moore & Van Allen PLLC

(57) ABSTRACT

A SEPIC driver circuit with low input current ripple is disclosed. Embodiments of the present invention provide a driver circuit that accommodates universal input, has a wide output voltage range and good efficiency. An LED lighting system using such as circuit is also disclosed. In at least some embodiments, the circuit is configured as a single-ended primary inductor converter circuit using a magnetic element, and a floating capacitor is connected between the input winding and the output winding of the magnetic element. In some embodiments, an inductor is also included at the DC input to the circuit. An output rectifier such as a diode can also be connected to the output winding of the magnetic element, and an output capacitor can be connected across the output of the circuit. An FET, a bipolar transistor, or a plurality of FETs can be used as the switching device.

20 Claims, 7 Drawing Sheets

SEPIC DRIVER CIRCUIT WITH LOW INPUT CURRENT RIPPLE

CROSS-REFERENCE TO RELATED APPLICATION

This application claims priority from provisional patent application Ser. No. 61/984,467, filed Apr. 25, 2014, the entire disclosure of which is incorporated herein by reference.

BACKGROUND

Light emitting diode (LED) lighting systems are becoming more prevalent as replacements for existing lighting systems. LEDs are an example of solid-state lighting (SSL) and have advantages over traditional lighting solutions such as incandescent and fluorescent lighting because they use less energy, are more durable, operate longer, can be combined in multiple color arrays that can be controlled to deliver virtually any color light, and generally contain no lead or mercury. In many applications, one or more LED dies (or chips) are mounted within an LED package or on an LED module, which may make up part of a lighting unit, lighting system, lamp, "light bulb" or more simply a "bulb," which includes at least one power supply (also called a "driver" or "driver circuit") to power the LEDs.

Drivers or power supplies may be used in electronic applications to convert an input voltage to a desired output voltage to power electronic devices such as the LEDs of a lamp or lighting system. Some power supplies may be classified as either a linear power supply or a switched-mode power supply. Switched-mode power supplies may be configured to operate more efficiently than linear power supplies. A switched-mode power supply may include a switching device that, when switching on and off, stores energy in an inductor or similar energy storage element and discharges the stored energy to an output of the switched-mode power supply. The switching device may be controlled by a control circuit or controller, which outputs switching signals to turn the switching device on and off. FIG. 1 illustrates a single-ended primary inductor converter (SEPIC) circuit 100 that can be used in some switched-mode power supplies. The circuit uses two inductors L1 and L2, an inline capacitor C, a diode D, and output capacitor Cout, and a transistor Q to providing a switching function. SEPIC topologies have heretofore not often been used with LED lighting systems. The SEPIC topologies are relatively complex with increased cost. The circuit can also generate greater current ripple than some others requiring EMI protection, which further increases cost.

SUMMARY

Embodiments of the present invention provide a driver circuit that accommodates universal input, has a wide output voltage range, good efficiency, and is implemented in a single stage for low cost. An LED lighting system using such as circuit is also disclosed. In at least some embodiments, the circuit is configured as a single-ended primary inductor converter (SEPIC) circuit using a magnetic element and a floating capacitor. The circuit can be used with or without an input rectifier, depending on whether the driver is being used with supplied AC or DC voltage. The SEPIC driver according to embodiments of the present invention can add flexibility to LED lighting designs by handling different input voltages and can work with LEDs of various voltages and configuration, including LEDs in series, LEDs in parallel, and LED strings in series and/or in parallel. While it has been found that modern LEDs can tolerate some current ripple, the design of the SEPIC according to example embodiments of the invention can reduce current ripple significantly, thereby reducing the need for EMI protection leading to cost and space reductions and enabling performance improvements.

In at least some embodiments, a driver circuit includes a switching device, a magnetic element further comprising an input winding and an output winding, an inductance selected to reduce switching ripple at an input, and a floating capacitor connected to the switching element, and further connected between the input winding and the output winding of the magnetic element. An output rectifier such as a diode can also be connected to the output winding of the magnetic element, and an output capacitor can be connected to the output rectifier and across the output of the circuit. The magnetic element can be a coupled inductor. The inductance selected to reduce switching ripple at the input can be provided by a separate input inductor, be incorporated into the coupled inductor, or by a combination of the two.

In some embodiments, the switching device can be or include a transistor (FET or bipolar). A control circuit can be connected to an FET to cause the FET to control the current through the input inductor and/or the transformer. In some embodiments, the coupled inductor is a transformer. The switching device can also be or include two FETs in a cascode configuration. In some embodiments the input inductor can be incorporated as leakage into the coupled inductor.

A lighting system according to example embodiments of the invention includes a single-ended primary inductor converter circuit with any arrangement of components described above, and a control circuit connected to the switching device to cause the switching device to control current as described above to supply an output current. At least one LED can be connected to the converter circuit to be operable to be energized by the output current.

In operation, when the system is powered up, the input voltage (which may be from an input rectifier) is received through an input inductor, if any. The switching device is controlled or caused to switch current through the input inductor and/or through the coupled inductor. An output current is in turn provided to the output capacitor connected to a diode that is in turn connected to the transformer and a floating capacitor, and in turn energizes at least one LED. In some embodiments, the coupled inductor has a turns ratio of one-to-one. In some embodiments the coupled inductor has an n-to-one turns ratio where n is greater than one, the built-in inductance resulting from the higher turns ratio serving as the inductance selected to reduce switching ripple at an input.

DETAILED DESCRIPTION

Figure 1:
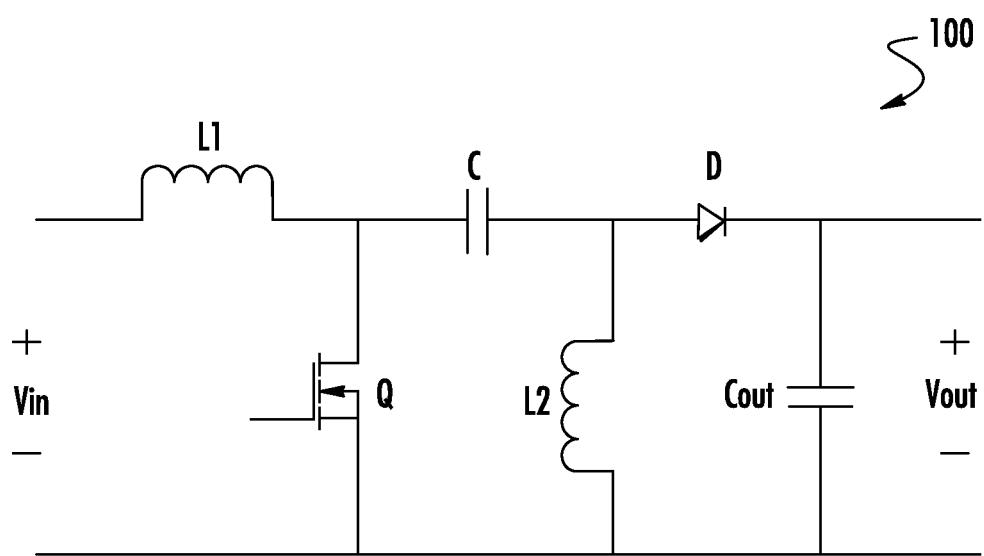
FIG. 1 is a schematic diagram of a SEPIC circuit.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid-state light emitter" or "solid-state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid-state light emitters and/or multiple lumiphoric materials (i.e., in combination with at least one solid-state light emitter) may be used in a single device, such as to produce light perceived as white or near-white in character. In certain embodiments, the aggregated output of multiple solid-state light emitters and/or lumiphoric materials may generate warm white light output having a color temperature range of from about 2700K to about 4000K.

Solid-state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid-state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials may be associated with a lumiphor, a lumiphor binding medium, or a lumiphor support element that may be spatially segregated from a solid-state emitter.

Figure 2:
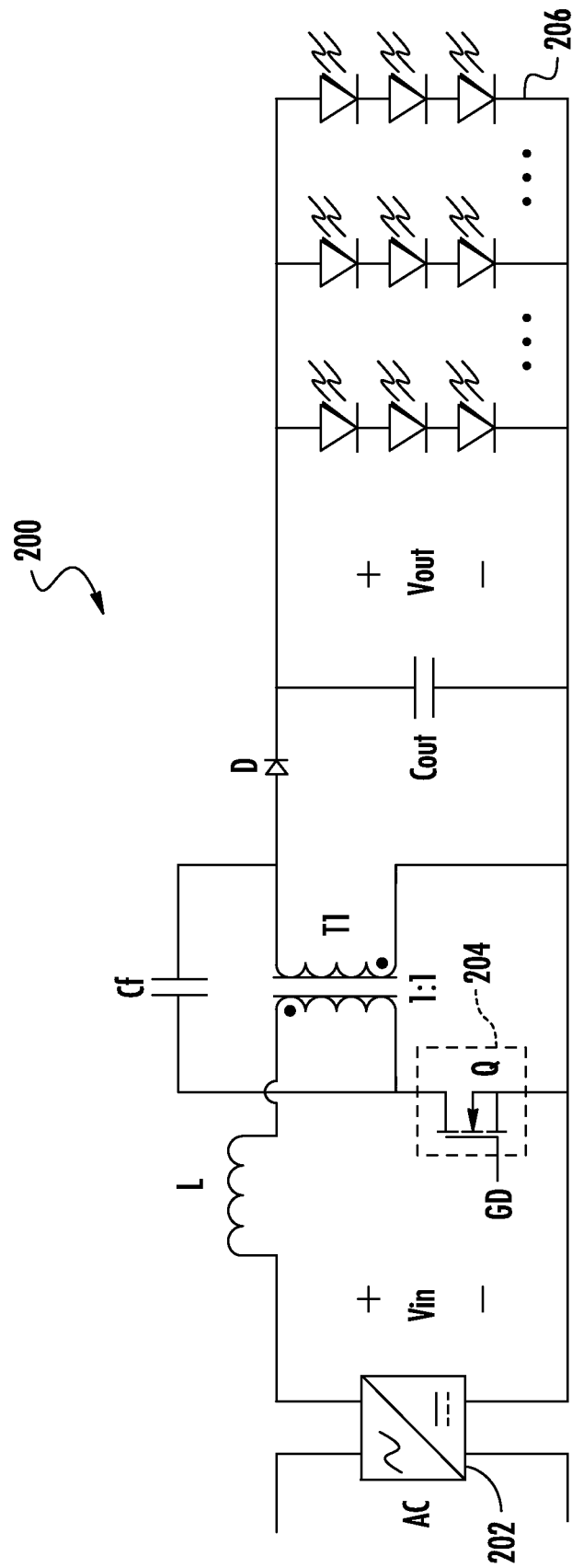
FIG. 2 is a schematic diagram of a driver circuit and a lighting system using the circuit according to example embodiments of the invention.

Electronic devices such as LED lighting systems can work with a variety of different types of power supplies or drivers. For example, a buck converter, boost converter, buck-boost converter, or single ended primary inductor converter (SEPIC) circuit could all be used as a driver for an LED lighting system or solid-state lamp. FIG. 2 is a schematic diagram of a lighting system 200, which includes a driver or converter circuit based on a SEPIC design according to example embodiments of the present invention. The driver for lighting system 200 takes an AC input voltage and provides a DC output current for the LEDs. The circuit includes a bridge rectifier, an input inductor, L, a coupled inductor, T1, and a floating capacitor, Cf. The circuit also includes switching device 204, which in this example is a single field-effect transistor (FET), more specifically a MOSFET. A controller or control circuit is connected to the gate drive (GD) terminal of the driver, which is in turn connected to the gate of the FET in this example. A suitable control circuit is disclosed in U.S.

patent application Ser. No. 14/071,733, entitled, "Minimum off time Control Systems and Methods for Switching Power Converters in Discontinuous Conduction Mode," which is incorporated herein by reference. It should be noted that input rectifier 202 is completely optional, as the system and driver may be used in DC power systems, such as those on vehicles or with battery operated devices. If an input rectifier is needed, as an example, a bridge rectifier can be used.

In the example of driver circuit of system 200 shown in FIG. 2, where a single inductor might otherwise be included, the coupled inductor T1 is used with an input winding connected to the input inductor and the switching device, and an output winding connected to ground or the reference terminal for the system. The floating capacitor Cf is connected between the input winding and the output winding of coupled inductor T1 and also connected to the switching device. In at least some embodiments, the coupled inductor has a one-to-one turns ratio. In the example of FIG. 2, the input inductor provides the inductance selected to reduce switching ripple at an input. The floating capacitor should have sufficient capacitance to keep a steady voltage within switching cycles. The floating capacitor will follow the input voltage.

The component values for the above example embodiment can vary and are highly dependent on switching frequency. In some embodiments, the input inductor has an inductance value from about 500 µH to about 2.5 mH. In some embodiments, the input inductor has a value from about 1 mH to about 2 mH. In some embodiments, the input inductor has a range from about 100 µH to about 5 mH. The floating capacitor value in some embodiments ranges from about 0.1 µF to about 1 µF. The floating capacitor can also have a value ranging from about 0.25 µF to about 0.75 µF, or in some embodiments from about 0.05 µF to about 1.5 µF. The coupled inductors herein should have values in the range of several hundred µH. In one example, the one-to-one coupled inductors have a value of about 270 µH.

In operation, the topology described above keeps the voltage across the input inductor very low to reduce input current ripple of the DC-to-DC portion of the circuitry in the lighting system. An output rectifier, such as diode D, is connected to the output winding of transformer T and supplies output current during the switching cycle, and the output capacitor Cout is connected to the output diode since it is connected across the output of the circuit. The driver circuit supplies output current to one or more series connected LEDs and one or more parallel LED strings 206. In this example three strings are shown. The circuit described above can handle both wide input voltage ranges and wide output voltage ranges. The input can range from 110 VAC to 300 VAC, so that a lighting system using a power supply based on embodiments of the invention can work in various countries and with various different types of power mains. The circuit described can also power LED strings and devices at voltages ranging from 30 V to 200 V. Typical lighting system LED strings can require about 48 V. A wide variation in the numbers of LED strings can be accommodated. Some lighting systems use a single string as shown in FIG. 2, while others use multiple strings. For example, lighting systems using three strings, with appropriate current regulator stages are described in U.S. patent application Ser. No. 14/291,829, filed on even date herewith.

Figure 3:
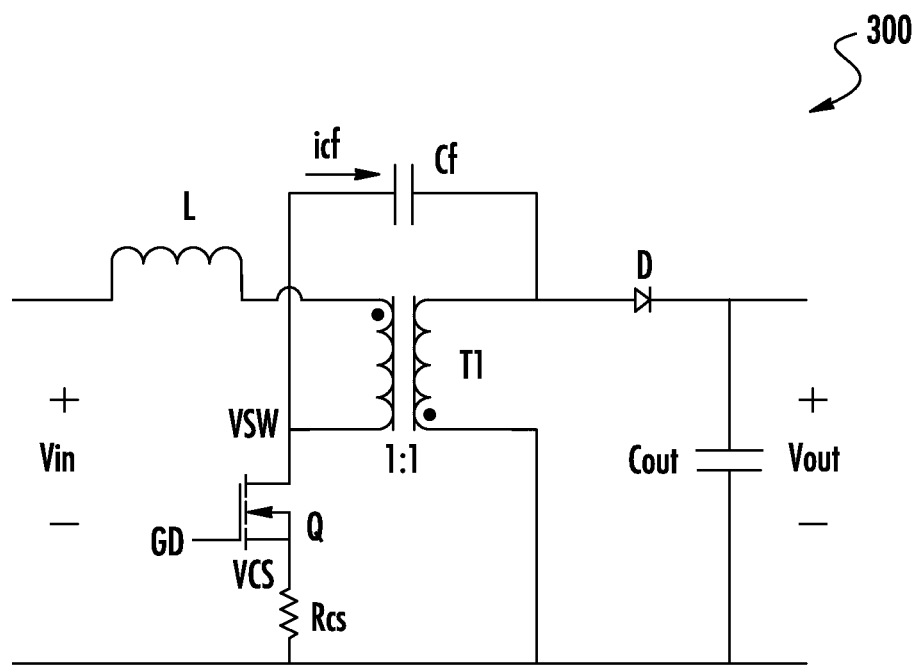
FIG. 3 is a schematic diagram of a converter circuit according to additional embodiments of the invention.

FIG. 3 is a schematic diagram for driver circuit 300, which includes added resistor Rcs, as may be required for the driver circuit to be used with some control circuits. Current through the floating capacitor is indicated as icf. Rcs serves as a sense resistor for some control circuits or controllers. The resistance of Rcs is determined by the power of the system, but in most applications will be less than one ohm. For example, a value of about 0.5 ohms works with many LED lighting systems. The control circuit needs to detect peak MOSFET current, which can be done by monitoring the voltage on sense resistor Rcs. When transistor Q is on, voltages vsw and vcs are almost identical, with only a tiny voltage drop across the transistor.

Figure 4:
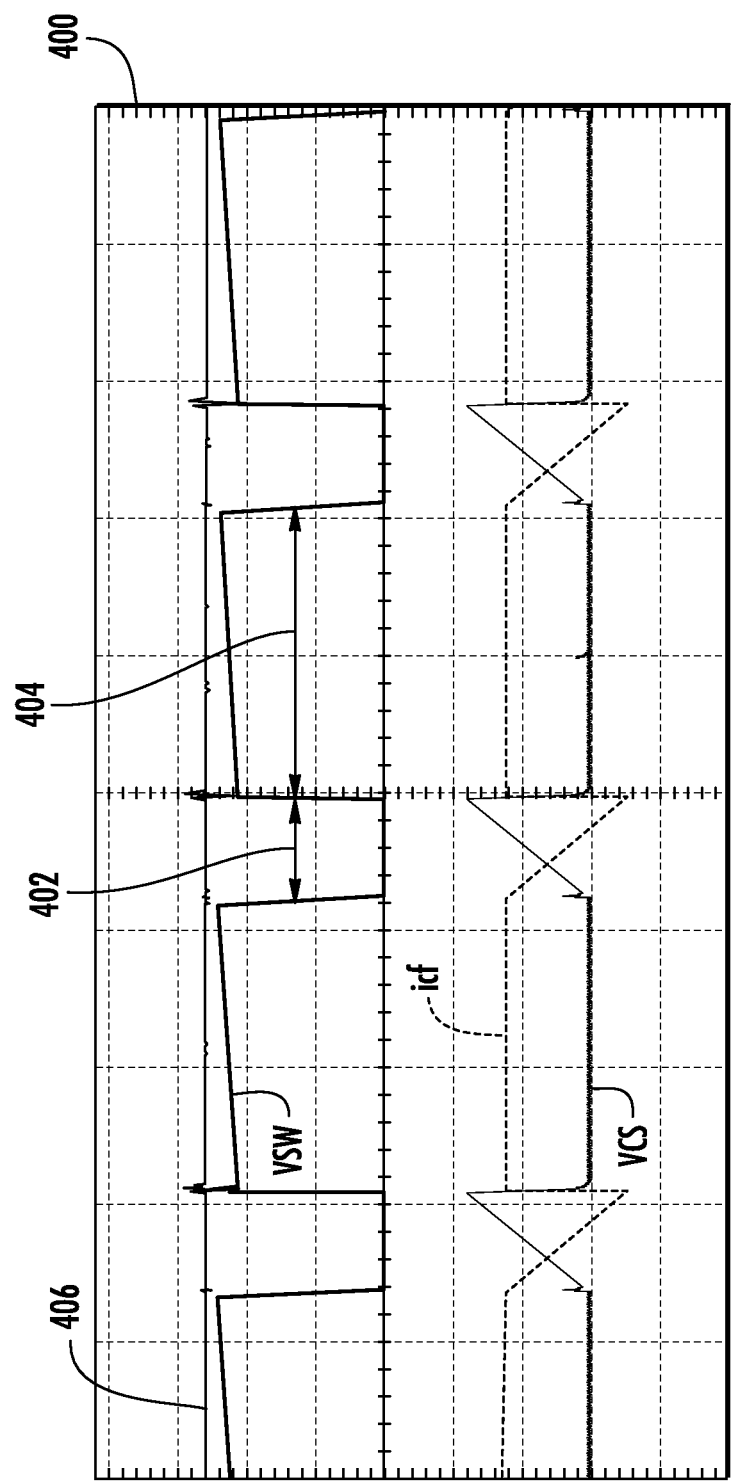
FIG. 4 is a waveform diagram illustrating current in various parts of a SEPIC circuit during operation.
Figure 5:
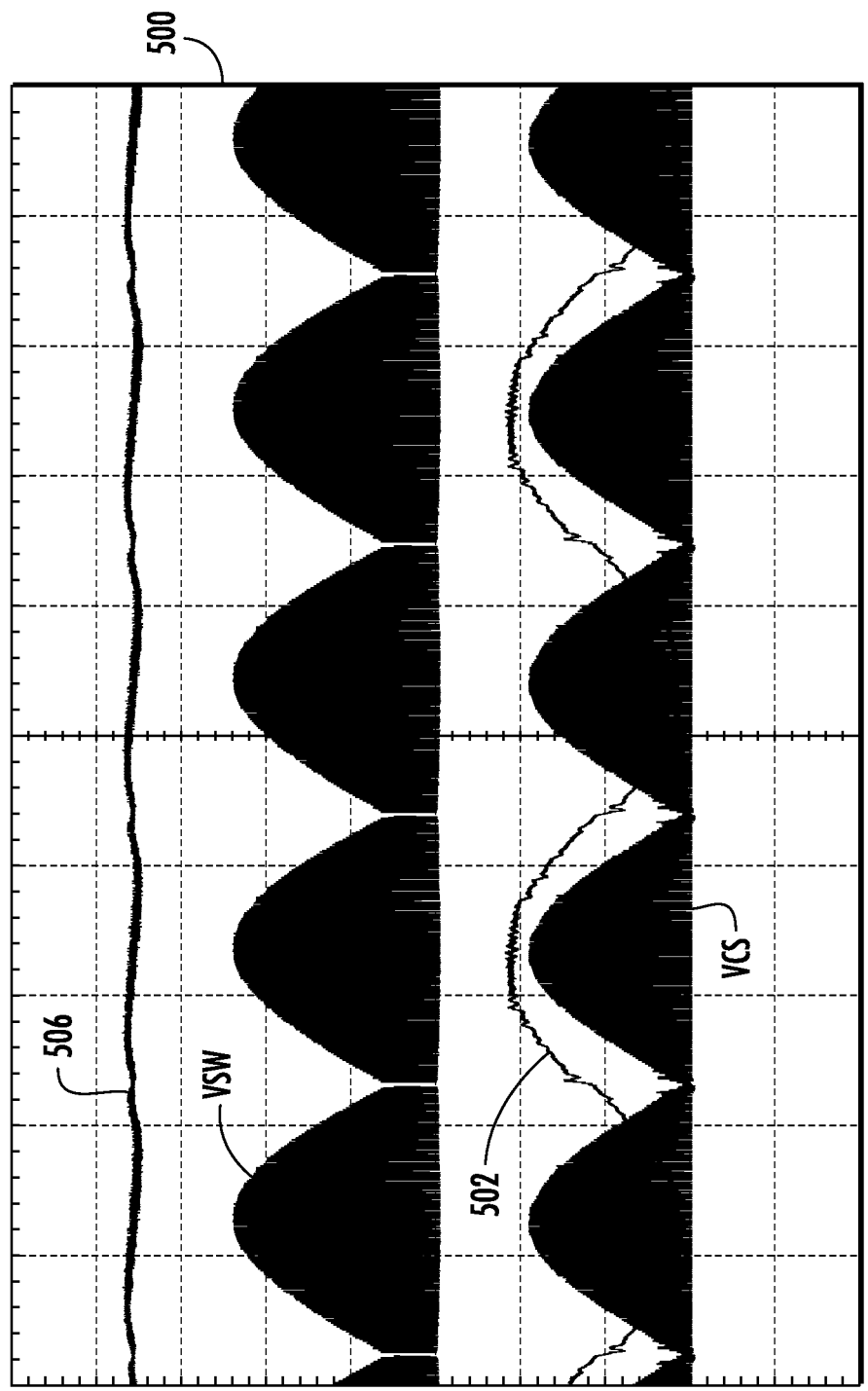
FIG. 5 is another waveform diagram illustrating current in various parts of a SEPIC circuit during operation. The waveforms in FIG. 5 are illustrated on a different scale than those shown in FIG. 4.

FIG. 4 and FIG. 5 show graphs 400 and 500, respectively, which illustrate the relative relationship of various voltages and currents in a driver circuit like that shown in FIG. 3. In graphs 400 and 500, vsw and vcs are shown on different scales so that the waveforms can be readily compared, with vsw being illustrated at 100 V/unit and vcs being illustrated at 0.5 V/unit. In FIG. 4 the waveforms are drawn on a time scale that illustrates cycle-by-cycle behavior. In FIG. 4, the switching device is on for period 402 and off for period 404. Waveform 406 illustrates current ripple on the AC side of the input rectifier. In FIG. 5, the waveforms on graph 500 are drawn on a time scale to show behavior over many cycles. Waveform 502 is the AC line current, and the ripple is shown as waveform 506. There is essentially no switching ripple on the AC input current to a lighting system using an embodiment of the driver circuit disclosed herein.

Operation in discontinuous conduction mode (DCM) or a combination of DCM and critical conduction mode (CRM) is can achieve high power factor (PF) and low total harmonic distortion (THD), which may be important to applications where a lighting system is directly connected to the grid. A control circuit can be used with a simple control IC like an L6562A integrated circuit manufactured by STMicroelectronics, Inc. can be used as a controller to realize a combination of DCM and CRM. Further explanation of such a control circuit can be found in the aforementioned U.S. patent application Ser. No. 14/071,733.

Figure 6:
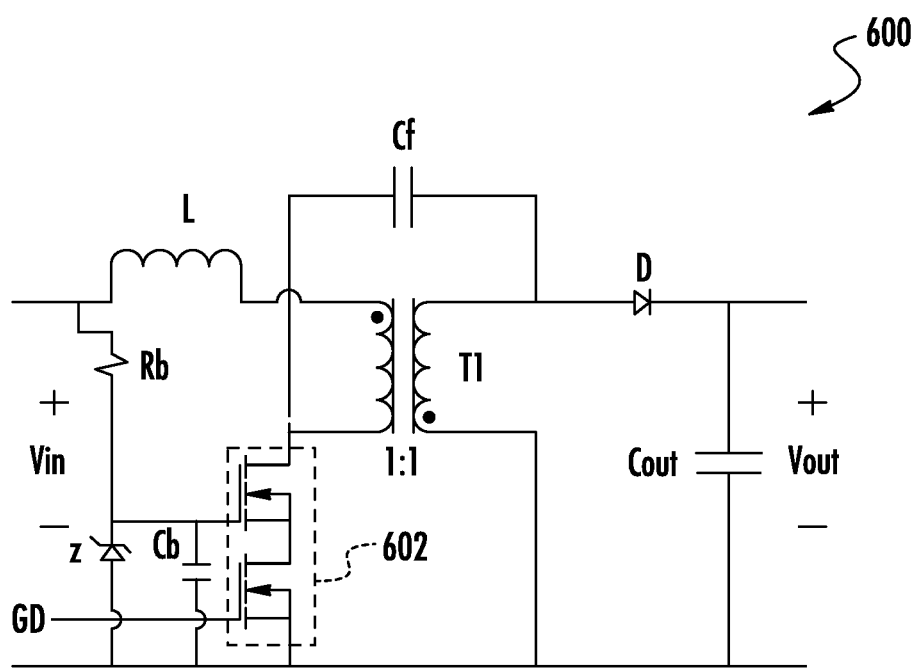
FIG. 6 is a schematic diagram of a converter circuit according to additional embodiments of the invention.

FIG. 6 illustrates the DC portion of a driver circuit 600 according to additional example embodiments of the invention. In this example, switching device 602 is a pair of MOSFET transistors arranged in a cascode configuration. The upper transistor is biased by resistor Rb, capacitor Cb, and a zener diode, Z. The lower transistor is connected to the gate drive signal. Other portions of the circuit are similar to those which have been previously described herein. In a design with cascoded FETs, the upper FET should have a small drain-source capacitance to avoid overvoltage on Vcc (the positive supply terminal) at startup.

Figure 7:
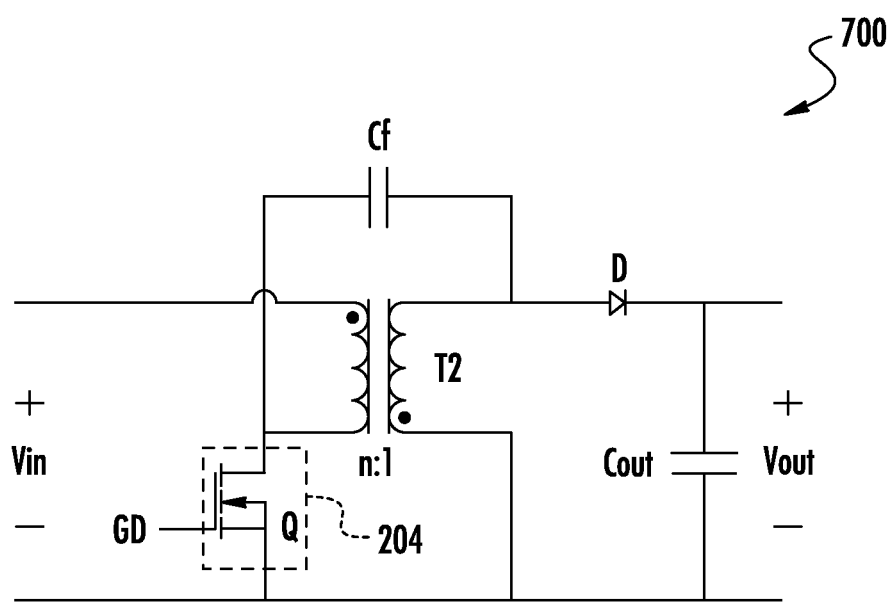
FIG. 7 is a schematic diagram of a converter circuit according to further additional embodiments of the invention.

FIG. 7 is a schematic diagram illustrating the DC portion of a driver circuit 700 according to additional example embodiments of the invention. In this case there is no input inductor. Coupled inductor T2 has an n-to-one turns ratio, where n is greater than one. The larger number of turns on the input winding of the coupled inductor can take make up for the lack of the input inductor and allow a reduced component count of a power supply based on this design. The value of n for the coupled inductor is determined by the degree of magnetic coupling between the windings. In the embodiment of FIG. 7, the inductance selected to reduce switching ripple at the input is incorporated into the coupled inductor. It could also be provided by a combination of the coupled inductor and an input inductor.

The various portions of a solid-state lamp or lighting system according to example embodiments of the invention can be made of any of various materials. Heat sinks can be made of metal or plastic, as can the various portions of the housings for the components of a lamp. A system according to embodiments of the invention can be assembled using varied fastening methods and mechanisms for interconnecting the various parts. For example, in some embodiments locking tabs and holes can be used. In some embodiments, combinations of fasteners such as tabs, latches or other suitable fastening arrangements and combinations of fasteners can be used which would not require adhesives or screws. In other embodiments, adhesives, screws, bolts, or other fasteners may be used to fasten together the various components.

Although specific embodiments have been illustrated and described herein, those of ordinary skill in the art appreciate that any arrangement, which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A driver circuit to control current in one or more series and parallel connected LEDs, the driver circuit comprising:
   a switching device;
   a magnetic element comprising an input winding and an output winding;
   an input inductor selected to reduce switching ripple at an input;
   an output rectifier connected to the output winding of the magnetic element;
   an output capacitor connected to the output rectifier; and
   a floating capacitor connected to the switching element, and between the input winding and the output winding of the magnetic element.

2. The driver circuit of claim 1 wherein the switching device comprises at least one of a field-effect transistor (FET) and a bipolar transistor.

3. The driver circuit of claim 2 further comprising a control circuit connected to the switching device to cause the switching device to control the current through the input inductor and the magnetic element.

4. The driver circuit of claim 3 wherein the magnetic element further comprises a coupled inductor with a one-to-one turns ratio.

5. The driver circuit of claim 3 wherein the magnetic element further comprises a coupled inductor with an n-to-one turns ratio where n is greater than one.

6. The driver circuit of claim 1 wherein the switching device comprises two field effect transistors (FETs) in a cascode configuration.

7. The driver circuit of claim 6 further comprising a control circuit connected to at least one of the two FETs to cause the switching device to control the current through the input inductor and the magnetic element.

8. The driver circuit of claim 7 wherein the magnetic element further comprises a coupled inductor with a one-to-one turns ratio.

9. The driver circuit of claim 7 wherein the magnetic element further comprises a coupled inductor with an n-to-one turns ratio where n is greater than one.

10. A lighting system comprising:
    a single-ended primary inductor converter (SEPIC) circuit comprising a switching device, a magnetic element, an inductor selected to reduce switching ripple at an input, and a floating capacitor connected between an input winding and an output winding of the magnetic element;
    a control circuit connected to the switching device to cause the switching device to control current through the magnetic element to supply an output current; and
    an LED connected to the single-ended primary inductor converter circuit to be operable to be energized from the output current.

11. The lighting system of claim 10 wherein the switching device comprises a field-effect transistor (FET).

12. The lighting system of claim 11 wherein the magnetic element further comprises a coupled inductor with a one-to-one turns ratio.

13. The lighting system of claim 11 wherein the magnetic element comprises a coupled inductor with an n-to-one turns ratio where n is greater than one.

14. The lighting system of claim 10 wherein the switching device comprises two field effect transistors (FETs) in a cascode configuration.

15. The lighting system of claim 14 wherein the magnetic element comprises a coupled inductor with a one-to-one turns ratio.

16. The lighting system of claim 14 wherein the magnetic element comprises a coupled inductor with an n-to-one turns ratio where n is greater than one.

17. A method of assembling a lighting system, the method comprising:
    providing a single-ended primary inductor converter (SEPIC) including a magnetic element, a coupled inductor, a switching device, and a floating capacitor connected to the switching device, the floating capacitor also connected between an input winding and an output winding of the magnetic element; and
    selecting a magnetic coupling for the coupled inductor to substantially reduce switching ripple at an input and control current in one or more series and parallel connected LEDs.

18. The method of claim 17 wherein the switching device comprises at least one field-effect transistor (FET).

19. The method of claim 18 wherein the SEPIC comprises an input inductor and wherein the coupled inductor has a one-to-one turns ratio.

20. The method of claim 18 wherein the coupled inductor has an n-to-one turns ratio where n is greater than one.

* * * * *